(12) United States Patent  (10) Patent No.: US 7,737,081 B2
Votsmeier et al.  (45) Date of Patent: Jun. 15, 2010

(54) METHOD OF OPERATING A CATALYST WHICH INCLUDES COMPONENTS FOR STORING HYDROCARBONS

(75) Inventors: Martin Votsmeier, Maintal (DE); Frank Schütze, Rodenbach (DE); Stephan Malmberg, Rodenbach (DE); Jürgen Gieshoff, Gelnhausen (DE); Egbert Lox, Grebenhain (DE); Thomas Kreuzer, Karben (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 786 days.

(21) Appl. No.: 10/556,548

(22) PCT Filed: May 12, 2004

(86) PCT No.: PCT/EP2004/005104

§ 371 (c)(1),
(2), (4) Date: Nov. 20, 2006

(87) PCT Pub. No.: WO2004/101964

PCT Pub. Date: Nov. 25, 2004

(65) Prior Publication Data

US 2007/0166827 A1   Jul. 19, 2007

(30) Foreign Application Priority Data

May 16, 2003   (DE)   ............................ 103 22 149

(51) Int. Cl.
*B01J 23/00* (2006.01)
*B01J 23/40* (2006.01)
*B01J 23/58* (2006.01)
*B01J 20/00* (2006.01)
*B01J 8/02* (2006.01)
*F01N 3/00* (2006.01)
*F01N 3/10* (2006.01)

(52) U.S. Cl. .................. 502/400; 502/325; 502/326; 502/327; 502/328; 60/276; 60/277; 60/285; 60/299; 423/213.5

(58) Field of Classification Search .................. None
See application file for complete search history.

(56) References Cited

FOREIGN PATENT DOCUMENTS

JP    2003035135 A    2/2003

OTHER PUBLICATIONS

Dubien, C., Schweich, D., Mabilon, G., Martin, B., Prigent, M. Three-way Catalytic Converter Modelling: Fast- and Slow Oxidizing Hydrocarbons, Inhibiting Species, and Steam-Reforming Reaction. Chemical Engineering Science, vol. 53, No. 3, pp. 471-481, 1998.*
International Search Report.
Written Opinion.
International Search Report, Aug. 2004.
Written Opinion, Aug. 2004.

* cited by examiner

*Primary Examiner*—Melvin C Mayes
*Assistant Examiner*—Sarah Van Oudenaren
(74) *Attorney, Agent, or Firm*—Kalow & Springut LLP; William D. Schmidt

(57) ABSTRACT

This invention relates to a method of operating a catalyst for treating the exhaust gas of an internal combustion engine, the catalyst comprising, in addition to catalytically active noble metals, also storage components for storing hydrocarbons. During engine operating phases at low exhaust-gas temperatures, such a catalyst stores the hydrocarbons contained in the exhaust gas without burning them. When the exhaust-gas temperature rises, these hydrocarbons are desorbed again and then oxidized at the catalytically active noble metals. This process can lead to uncontrolled, vigorous combustion of the hydrocarbons stored on the catalyst and, therefore, damage to the catalyst. According to the invention, this damage is avoided by continuously calculating the respective loading of the storage components with hydrocarbons and repeatedly regenerating the storage components depending on the loading by temporarily raising the exhaust-gas temperature before damage to the catalyst can occur.

6 Claims, 2 Drawing Sheets

METHOD OF OPERATING A CATALYST WHICH INCLUDES COMPONENTS FOR STORING HYDROCARBONS

FIELD OF INVENTION

This invention relates to a method of operating a catalyst for treating the exhaust gas of an internal combustion engine, the catalyst comprising, in addition to catalytically active noble metals, also storage components for storing hydrocarbons.

BACKGROUND OF THE INVENTION

In the purification of the exhaust gases of internal combustion engines, catalysts are frequently employed which include, i.a., components for storing the hydrocarbons contained in the exhaust gas.

Typical catalysts of this type are, for example, so-called diesel oxidation catalysts. They frequently include platinum-activated aluminum oxide or aluminum silicate as oxidation components and various zeolites as storage components. These catalysts are employed for the oxidative purification of the exhaust gases of diesel engines, i.e., they are designed to combust carbon monoxide contained in the exhaust gas and unburned hydrocarbons, that is to say, to convert them into carbon dioxide and water.

During engine operating phases at low exhaust-gas temperatures, the zeolites store the hydrocarbons contained in the exhaust gas. Conversion of the hydrocarbons in these operating phases is impossible as the catalyst's oxidation components are inactive due to the low temperatures during these operating phases. In modern diesel engines, such operating phases occur both after cold start and during idling phases and low-load operating phases, for example, in city traffic.

When the exhaust-gas temperature rises, the stored hydrocarbons are desorbed again and oxidized at the now active oxidation components. Examinations carried out by the inventors showed that when the temperature rises following prolonged operation of the catalyst at low temperatures and a correspondingly long storage period, sudden release and, at the same time, combustion of larger amounts of hydrocarbons can occur. As a result of this uncontrolled, vigorous combustion, the catalyst is exposed to high temperatures. This can result in damage to the catalyst. After desorption and combustion of the hydrocarbons, the storage components are ready to accept hydrocarbons again, provided no damage has occurred by possibly excessive temperatures during combustion.

SUMMARY OF THE INVENTION

It is an object of the present invention to provide a method of operating such catalysts which prevents the catalysts from being damaged during regeneration of the storage components. Regeneration of the catalyst is understood to be the deliberate desorption and combustion of the hydrocarbons adsorbed by the storage components by increasing the exhaust-gas temperature.

This object is solved by a method of operating a catalyst according to claim 1. In addition to catalytically active noble metals, the catalyst also includes storage components for storing hydrocarbons. The method is characterized in that the respective loading of the storage components with hydrocarbons is continuously calculated, and timely regeneration of the storage components is repeatedly initiated on the basis of the calculated loading value before any excessively high loading value can lead to thermal damage during regeneration of the storage components.

DETAILED DESCRIPTION OF THE PREFERRED EMBODIMENTS

As an example, the catalyst may be a diesel oxidation catalyst disposed in the exhaust-gas system of a diesel engine. Such a catalyst preferably includes one or more of the platinum group metals platinum, palladium, rhodium and iridium as catalytically active components. It is particularly preferred that such a catalyst includes platinum applied in a finely divided manner on a high surface area support material. Suitable support materials are, for example, active aluminum oxide, silicon dioxide, titanium oxide, zirconium oxide and mixed oxides thereof. They comprise specific surface areas of more that 10 $m^2/g$ and are therefore referred to as high surface area materials.

Suitable storage components are zeolites, preferably at a modulus (molar ratio of silicon dioxide to aluminum oxide) of more than 10, but other storage components, such as activated carbon, for example, may also be employed. The storage components may be used without or with catalytic activation, for example, with platinum. These storage components adsorb the hydrocarbons from the exhaust gas of the internal combustion engine at temperatures of up to about 200° C. at the location of the catalyst. Above 200° C., desorption of hydrocarbons prevails over their adsorption.

According to the invention, uncontrolled desorption and combustion of the stored hydrocarbons is avoided by monitoring the loading state of the catalyst's storage components. For this purpose, a loading limit may be specified in order to initiate regeneration when this limit is reached or exceeded.

Alternatively, during loading of the storage components with the hydrocarbons, the location- and time-resolved temperature distribution to be expected during regeneration may be calculated, and regeneration may be initiated before damage to the catalyst is expected based on the calculated data on temperature and duration of temperature load. Thus, regeneration may, for example, be initiated when the calculated peak temperatures in the catalyst approach or exceed a threshold temperature. The threshold temperature may be specified in advance. It is even better to consider also the duration of this maximum temperature load when taking the decision, as damage to the catalyst components does not only depend on the temperature level but also on the duration of the temperature load.

Thermal ageing of the catalyst mainly results from sintering of the noble metal particles and an inevitably resultant reduction of the catalytically active noble metal surface. Decrease in catalytic activity as a function of the temperature profile may be approximated by mathematical models (see, for example, G. A. Fuentes, E. D. Gamas, Towards a Better Understanding of Sintering Phenomena in Catalysis; Catalyst Deactivation, Elsevier, C. H. Bartholomew and J. B. Butt (editors); 1991).

It is particularly preferred to use such a catalyst damage model in order to directly compute a potential damage profile from the temperature profiles calculated for a potential regeneration event. Regeneration is initiated when the potential catalyst damage in case of a burn-off event reaches or exceeds a given damage threshold value locally or as an average over the catalyst.

A simple model calculation may be used to determine also a light-off temperature of the catalyst from the calculated damage profile. Regeneration is initiated when the calculated light-off temperature exceeds a predetermined value or when the calculated increase in the light-off temperature exceeds a permitted increase in the light-off temperature as a result of the forthcoming regeneration.

In order to initiate regeneration, the exhaust-gas temperature of the internal combustion engine may be raised by engine modifications at the location of the catalyst. These engine modifications include, for example, post-injection of fuel, late combustion or multistage combustion. As a result of these engine modifications, the engine's exhaust-gas temperature increases.

If the respective concentration of the hydrocarbons in the exhaust gas and the respective temperature of the catalyst are known, loading of the storage components may be determined by continued integration taking the temperature-dependent adsorption properties of the storage components into account. The concentration of hydrocarbons necessary for this purpose may also be calculated. This can be done by means of an engine model or by using previously stored characteristic maps. The instantaneous exhaust-gas temperature at the catalyst location is either measured or calculated as well, which may also be done by means of a catalyst model in connection with an engine model or by using previously stored characteristic maps.

Regeneration will undo the loading of the storage components with hydrocarbons and prepare the catalyst for renewed adsorption of hydrocarbons from the exhaust gas.

Modern engines are predominantly equipped with an electronic engine management system. Therefore, the calculations needed for the present method may advantageously be integrated into the engine management system. However, a calculating unit separate from the engine management system, which receives the necessary operating parameters and characteristic maps from the engine management system, is also possible.

DESCRIPTION OF THE FIGURES

The invention will now be explained in detail with reference to the two accompanying figures in which

FIG. 1 shows the measurement of temperature upstream and downstream of a diesel oxidation catalyst which was disposed in the exhaust-gas line of a diesel passenger car having a displacement of 2.7 liters.

The catalyst consisted of an inert honeycomb body made of cordierite and having a length of 152 mm, a diameter of 123 mm and a cell density of 62 $cm^{-2}$ (number of flow ducts per $cm^2$). The honeycomb body was coated with a catalyst which contained 3.2 g platinum per liter of honeycomb body on an aluminum silicate. In addition, the catalyst contained 30 g zeolites per liter of honeycomb body as storage components.

Figure 1:
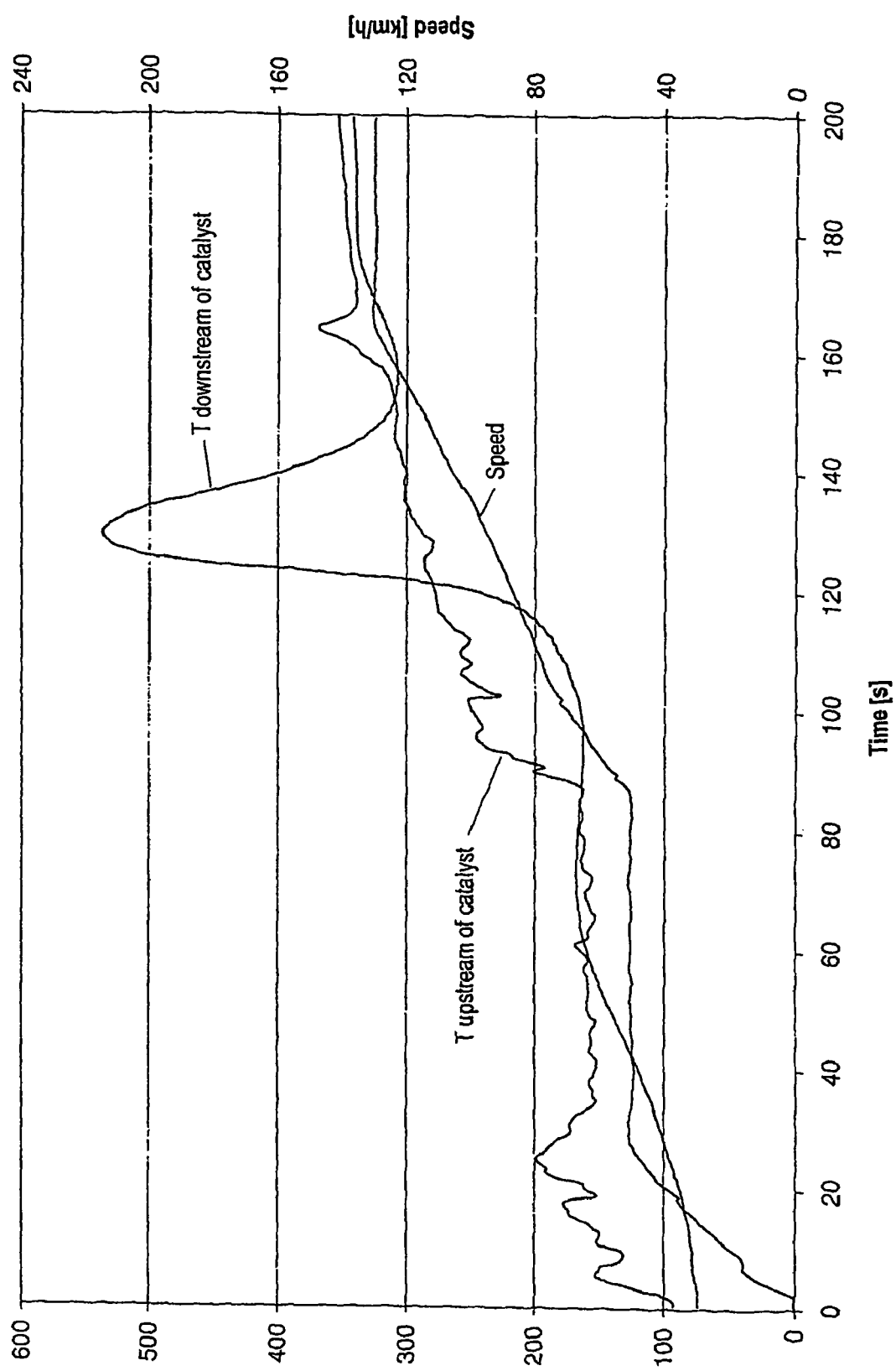
FIG. 1 shows the change in temperature upstream and downstream of a diesel oxidation catalyst as a function of desorption and combustion of stored hydrocarbons on the catalyst.

FIG. 1 shows the temperature measurements for a running time of 200 seconds after cold start of the engine. Also, FIG. 1 indicates the speed of the vehicle versus time. The temperature upstream of the catalyst reaches about 250° C. after about 100 seconds during an acceleration phase of the vehicle. At that exhaust-gas temperature, the temperature downstream of the catalyst also increases slowly and then rises explosively to more than 500° C. This rapid increase in temperature is caused by uncontrolled desorption and combustion of the hydrocarbons stored during cold start and may result in damage to the catalyst.

The proposed method is intended to avoid the temperature peaks measured in FIG. 1 by timely regeneration of the storage components.

Figure 2:
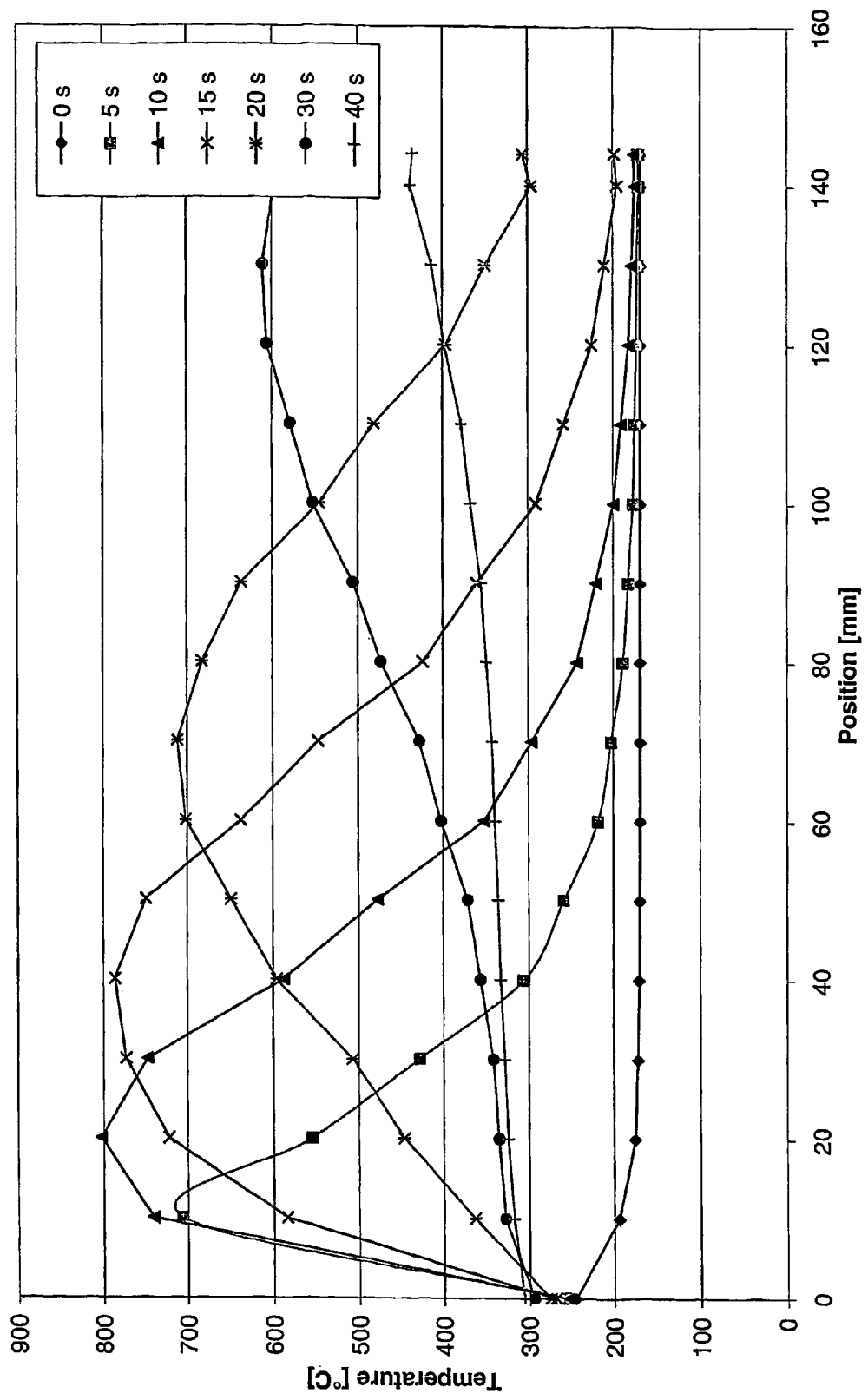
FIG. 2 shows simulated calculations for the temperature distributions in a catalyst during regeneration of the storage components.

FIG. 2 shows simulated calculations for the temperature distributions along a catalyst. The calculations assume that 0.54 moles of hydrocarbons (as C1) are stored on the catalyst. The temperature distributions are calculated for various times following the start of desorption of hydrocarbons. A maximum temperature of 800° C. develops after 10 seconds at a distance of 20 mm from the entrance side of the catalyst. The heat released corresponds to an average power of 10 kW over 100 to 150 seconds and a peak power of 30 to 40 kW.

The calculations were carried out using a program based on the Finite Volume Method (G. C. Koltsakis, I. P. Kandylas, A. M. Stamatelos, Chem. Eng. Comm. 1998, Vol. 164, pp. 153-189 and citations contained therein). This program or similar algorithms are suitable for calculating in advance the temperature load during regeneration of the storage components, thereby permitting regeneration to be initiated before excessively high temperatures can occur during combustion of the desorbed hydrocarbons.

What is claimed is:

1. A method of operating a catalyst for treating an exhaust gas of an internal combustion engine, which catalyst, in addition to catalytically active noble metals, also comprises storage components for storing hydrocarbons, characterized in that a respective loading of the storage components with hydrocarbons is continuously calculated, and timely regeneration of the storage components is repeatedly initiated on the basis of the calculated loading value before any excessively high loading value can result in thermal damage during regeneration of the storage components, wherein (i) the loading of the storage components is determined by continued integration from a respective concentration of the hydrocarbons in the exhaust gas and a respective temperature of the catalyst, which takes temperature-dependent adsorption properties of the storage components into account, the concentration of the hydrocarbons in the exhaust gas being continuously calculated and the temperature at the catalyst being either measured or calculated as well, and (ii) the calculation of the respective concentration of the hydrocarbons in the exhaust gas is carried out by means of an engine model or using previously stored characteristic maps; and (iii) the respective catalyst temperature is calculated using a catalyst model in connection with the engine model or using the previously stored characteristic maps.

2. The method according to claim 1, characterized in that regeneration is respectively initiated after a predetermined loading limit has been reached.

3. The method according to claim 1, characterized in that, during loading of the storage components with hydrocarbons, the location- and time-resolved temperature distribution in the catalyst to be expected during regeneration is calculated, and regeneration is initiated before damage to the catalyst is expected based on the calculated data on temperature and duration of temperature load.

4. The method according to claim 3, characterized in that regeneration is initiated before calculated peak temperatures in the catalyst exceed a threshold temperature.

5. The method according to claim 3, characterized in that, by means of a temperature profile to be expected during regeneration and using a damage model, a potential damage profile is calculated, and regeneration is initiated when the calculated catalyst damage reaches or exceeds a given threshold value locally or as an average over the catalyst.

6. The method according to claim 3, characterized in that, by means of a temperature profile to be expected during regeneration and using a damage model, a potential damage profile and, therefrom, a light-off temperature of the catalyst are calculated, and regeneration is initiated when the calculated light-off temperature exceeds a predetermined value or when the calculated increase in the light-off temperature exceeds a permitted increase as a result of regeneration.

* * * * *